UNITED STATES PATENT OFFICE 2,480,743

BASIC ALUMINUM SALT OF AN ALIPHATIC AMINO ACID AND METHOD OF PREPARING THE SAME

John C. Krantz, Jr., and Dorothy V. Kibler, Baltimore, Md.; said Kibler assignor to said Krantz No Drawing. Application May 3, 1946, Serial No. 667,124

11 Claims. (Cl. 260—448)

This invention relates to a composition adapted for use for the relief of excess gastric acidity and to a method for preparing such a composition. More particularly, the invention pertains to a composition on this order comprising a basic aluminum salt of a water soluble aliphatic amino acid such as glycine and to a method of preparing such an aluminum salt.

Several methods of overcoming excess gastric acidity and stomach distress are in common use. One method involves the use of sodium bicarbonate, which acts very promptly. This method is open to the objection that an excess amount of sodium bicarbonate will render the stomach actually alkaline, hence making bad matters worse. Calcium carbonate and alumina gels sold under various trade names have also been used but are open to the objection that their action is somewhat slow.

We have now found that aluminum and water soluble aliphatic amino acids can be combined to form novel basic compounds which are particularly well adapted for use as neutralizing agents for overcoming excess gastric acidity and stomach disturbances. Our novel aluminum compounds of amino acids contain a free amino group that can readily unite with free acid in the stomach to form the corresponding amine hydrochloride. The basic hydroxyl groups of the compounds also neutralize two moles of hydrochloric acid. The novel aluminum salts of aliphatic amino acids of our invention then slowly hydrolyze, thereby reacting with yet another mole of hydrochloric acid to effect a prolonged continuous neutralizing action.

It is therefore an important object of the present invention to provide novel antacid agents for overcoming excess gastric acidity and stomach distress.

A more specific object of the invention is to provide an antacid of the type indicated including a basic aluminum compound of a water soluble aliphatic amino acid.

A further specific object of the present invention is to provide methods for the preparation of the above disclosed basic aluminum compounds of water soluble aliphatic amino acids.

Other and further objects and features of the present invention will become apparent from the following description and appended claims.

In preparing the novel pharmaceutical compositions of this invention, we use as one starting material a specific type of aliphatic amino acid, namely, an aliphatic amino acid that is freely soluble in water and that is insoluble or practically insoluble in an inert organic solvent such as ethyl ether, absolute ethyl alcohol or xylene. The preferred aliphatic amino acid is glycine, although we can also employ other aliphatic amino acids soluble in water and insoluble in organic solvents, for instance, alanine, lysine, glutamic acid or arginine.

The first step in the preparation of the novel pharmaceutical compositions of this invention is the preparation of an aqueous solution of glycine or other aliphatic amino acid of the type indicated. Preferably, and for reasons indicated hereinbelow, this aqueous aliphatic amino acid solution is fairly concentrated. For instance, in the case of glycine, the solution should contain at least one part of glycine for each ten parts of water or, still better, at least one part of glycine for each four parts of water. Best results are obtained when only two parts of water are used for each part of glycine. In the case of other water soluble aliphatic amino acids, similar concentrations are preferred whenever permitted by the solubility of the particular aliphatic amino acids being used, although, as disclosed hereinbelow, compositions that are satisfactory, even if not as good (for neutralizing purposes), can be prepared with more dilute solutions of aliphatic amino acids.

With the dissolved aliphatic amino acid we react an aluminum alcoholate. The preferred aluminum alcoholate is aluminum isopropoxide, although other aluminum alcoholates may be used, for instance, the aluminum alcoholates formed with a butyl alcohol such as isobutyl alcohol.

Most suitably, about one mole of the alcoholate is reacted with a slight excess, for instance, about 1.1 mole of glycine or other water soluble aliphatic amino acid. However, a larger excess of aliphatic amino acid may be used with good results. Thus, one mole of aluminum isopropoxide may be added to an aqueous solution of three or more moles of glycine.

The alcoholate is preferably added in freshly prepared form or in solution in the corresponding anhydrous alcohol. In order to effect complete solution of the amino acid in limited quantities of water it is necessary to use temperatures near the boiling point of water, say, approximately, 80° C. or thereabout.

On addition of the aluminum alcoholate to the aliphatic amino acid solution, an insoluble aluminum compound of the amino acid is obtained, practically all of the alcoholate being used up in the formation of this insoluble compound.

The precipitated aluminum compound is separated from the liquid by filtration, then, if desired, washed with water (to remove excess amino acid), and sucked as dry as possible. Residual alcohol is removed from the compound by drying at elevated temperatures not in excess of 160° C.

As disclosed hereinabove, alanine or other water soluble aliphatic amino acids insoluble in organic solvents may be substituted for glycine. The resulting compounds are similar to aluminum glycinate but, due to the higher molecular weight of alanine and other aliphatic amino acids than glycine, contain a smaller percentage of aluminum and are therefore not as desirable as the aluminum compounds formed with glycine.

We have been unable to prepare the basic aluminum compounds of the present invention by any other method than that disclosed hereinabove. Thus, the basic aluminum salts of aliphatic amino acids of the present invention cannot be prepared by double decomposition reactions, such as a reaction between sodium glycinate and an aluminum salt. Efforts to prepare an aluminum salt of alanine or glycine by double decomposition between an inorganic aluminum salt and a sodium salt of the respective amino acids invariably resulted only in the precipitation of aluminum hydroxide. Nor can the basic aluminum salts of aliphatic amino acids of the present invention be prepared by the action of the free amino acid on metallic aluminum, aluminum oxide, or aluminum hydroxide, or other insoluble aluminum compounds.

Our inability to prepare basic aluminum salts by double decomposition between an inorganic aluminum salt and a sodium salt of an aliphatic amino acid is readily understandable in view of the extremely weak acidic nature of the aliphatic amino acids in comparison with the strong acids that the aliphatic amino acids are to replace in a double decomposition with an aluminum salt. As will be disclosed hereinbelow, the basic aluminum salts of aliphatic amino acids of the present invention are subject to hydrolysis on prolonged boiling with water, which indicates the irreversible nature of this hydrolysis and the inability of the aliphatic amino acids in question to react with the aluminum hydroxide liberated in this hydrolysis.

Any significant reaction between free aliphatic amino acids and aluminum hydroxide or the like should in any case not be expected in view of the insolubility of the basic aluminum salts that would result. This situation is quite analogous to the absence of any significant reaction between sulfuric acid and lead due to the insolubility of lead sulfate.

The aluminum salts obtained by the method disclosed hereinabove are basic salts containing one atom of aluminum and the acid radical derived from one molecule of the amino acid. The aluminum glycinate, for instance, may be represented by the formula $$NH_2-CH_2-COOAl(OH)_2$$

The nitrogen content of the basic aluminum mono-glycinate prepared as described hereinabove is 9.3%; the aluminum content is 18.3%. The Al:N ratio is 1.97. The theoretical value from the foregoing formula is 1.93. The calculated nitrogen content is 10.37%, while the calculated aluminum content is 20.0%.

Small amounts of the di-glycinate and tri-glycinate of aluminum may be formed along with the mono-glycinate.

That a definite compound has been formed is shown by the fact that the Al:N ratio was found to be reproduced in many different batches prepared with different ratios of glycine to aluminum alcoholate; the fact that on boiling an aqueous suspension of basic aluminum mono-glycinate for six hours hydrolysis occurred with regeneration of glycine and precipitation of aluminum hydroxide; and the fact that the titration curves for basic aluminum mono-glycinate and comparable mixtures of glycine and aluminum hydroxide are radically different. For instance, one gram of a mixture of 15.6 grams aluminum hydroxide and 15 grams glycine will neutralize 8.57 cc. of 0.1 normal hydrochloric acid to a pH of 3.7, while one gram of basic aluminum mono-glycinate neutralizes 150 cc. of 0.1 normal hydrochloric acid to a pH of 3.7 (in both cases after agitation for ten minutes).

When 200 milligrams of aluminum mono-glycinate are treated with 50 cc. of 0.1 normal hydrochloric acid and allowed to stand in the acid for one hour at 37.5° C. with some agitation, and the excess acidity is titrated back with 0.1 normal sodium hydroxide using bromophenol blue as an indicator (United States Pharmacopoeia XII, page 200), values are obtained that show that one gram of aluminum mono-glycinate will neutralize 152.7 cc. of 0.1 normal hydrochloric acid to a pH of 3.8. A similar test of the above mentioned mixture of aluminum hydroxide and glycine indicates that one gram of the mixture will neutralize 8.96 cc. of 0.1 normal hydrochloric acid to a pH of 3.8.

The preceding data relating to aluminum mono-glycinate were obtained with the product prepared with the use of a highly concentrated glycine solution. When aluminum mono-glycinate is prepared with the use of more dilute glycine solutions, data are obtained indicating that a limited amount of aluminum hydroxide is precipitated along with the aluminum mono-glycinate. The effect of dilution of a glycine solution used in the preparation of aluminum mono-glycinate is evident from data tabulated hereinbelow showing results obtained when glycine solutions of various concentrations are used.

| Sample | Wt. Ratio Glycine/Water | Percent $H_2O$ | Percent [1] $N_2$ | Percent [1] Al | A. C. P.[2] |
|---|---|---|---|---|---|
| 1 | 1 to 2 | 10.0 | 10.49 | 18.80 | 156 |
| 2 | 1 to 3 | 6.7 | 9.51 | 19.83 | 154 |
| 3 | 1 to 4 | 8.5 | 9.54 | 20.10 | 150 |
| 4 | 1 to 5 | 8.0 | 9.01 | 21.00 | 146 |

[1] Calculated to dry basis.
[2] Cc. of 0.1 N HCl per gram of material.

The data tabulated hereinabove were obtained by reacting fixed amounts of aluminum isopropoxide with fixed amounts of glycine dissolved in varying amounts of water. The products from these various preparations were removed, air dried, and subsequently analyzed for moisture, nitrogen and aluminum. The acid-consuming capacity (A. C. P.) of each product was determined by a method similar to that given in the United States Pharmacopoeia for the assay of aluminum hydroxide gel.

The tabulated results indicate that when less concentrated glycine solutions are used a product is formed containing slightly less nitrogen and slightly more aluminum, probably due to coprecipitation of some aluminum hydroxide. However, the acid-consuming capacity, although slightly reduced, is not reduced to a very significant extent and remains much greater than the acid-consuming capacity of the corresponding amount of a mixture of one mole of glycine with one mole of aluminum hydroxide. Hence, the products prepared by the use of less concentrated glycine solutions are quite satisfactory for use as antacids. One reason for the preferred use of more concentrated glycine solutions is the fact that the products obtained by the use of such more concentrated solutions are filtered off much more easily from the mother liquors in which they are precipitated.

Another characteristic of the basic aluminum salts of water soluble aliphatic amino acids of the present invention, in particular, of aluminum mono-glycinate, is the failure of our compositions to react or combine with acetyl salicylic acid. Both the basic aluminum salts of aliphatic amino acids of the present invention and acetyl salicylic acid are relatively insoluble in water and a mixture of the two types of compositions with water shows no apparent increase in the solubility of either type of composition. When aluminum mono-glycinate is added to a suspension of acetyl salicylic acid in water the pH of the suspension is not appreciably affected, which indicates the failure of any reaction or combination to occur.

Extensive tests have been carried out to determine the function of the amino group in acid neutralization with aluminum mono-glycinate, the immediate buffer capacity of aluminum monoglycinate, the prolonged acid consuming capacity of aluminum glycinate and the buffer capacity of aluminum mono-glycinate. These tests are reported in the article by John C. Krantz, Jr., et al. entitled "The Neutralization of Gastric Acidity with Basic Aluminum Aminoacetate," published on pages 247–253 of the November, 1944, issue of The Journal of Pharmacology and Experimental Therapeutics (volume 82). As shown by the data reported in this article, the basic aluminum glycine salt is more prompt in its buffering of hydrochloric acid than is dried aluminum hydroxide gel; the prolonged acid consuming capacity of basic aluminum aminoacetate is likewise greater than that of dried aluminum hydroxide gel; and the buffer capacity of basic aluminum aminoacetate is approximately six times that of dried aluminum hydroxide gel.

The aluminum compounds of aliphatic amino acids disclosed hereinabove may be used to reduce excess gastric acidity by a double action including a rapid initial reaction of the free amino group in the aluminum compound with hydrochloric acid present in the stomach, a slower reaction of the basic hydroxyl groups and a prolonged continuous hydrolysis of amino acid-aluminum compound which also serve to neutralize excess acidity. The novel compounds of this invention have the advantage of being practically tasteless (having a faintly sweet taste) and are suitable for use alone or in combination with other medications in the form of powders, tablets, or as a suspension in water. For compounding purposes, any of the conventional inert fillers used in the preparation of powders, tablets or suspensions may be used.

More particularly, basic aluminum glycinate may be put up in the form of a plain tablet or tablets containing 1/150 grain atropine or a quarter grain phenobarbital or both; or a magma may be prepared such as a suspension of basic aluminum glycinate in bentonite and water containing a preserving agent such as oxyquinolin sulfate, sodium benzoate, sodium salicylate, benzoic acid or the like; or an effervescent salt may be prepared as directed in the United States Pharmacopoeia XII, page 419.

Aluminum mono-glycinate or mono-alaninate may suitably be administered in doses of one gram to two grams between meals and at bedtime in tablet or gel form.

Feeding experiments with rats have been carried out and are reported in the above identified article by J. C. Krantz et al. No abnormalities due to administration of aluminum mono-glycinate could be found. With respect to ingestion by humans, basic aluminum aminoacetate has been administered to twenty persons in doses of two to four grams in powder form, suspended in water. It was tolerated without symptoms. Two cases of active peptic ulcer were treated with the salt as the sole antacid. Healing was observed by the gastroscope and the patients became asymptomatic. Two cases of latent peptic ulcer with postprandial distention and hyperacidity obtained prompt and prolonged relief upon the ingestion of 0.5 gram compressed tablets of the salt.

Many details of preparation and composition may be varied within a wide range without departing from the principles of this invention and it is, therefore, not our purpose to limit the claims granted in this application otherwise than necessitated by the scope of the appended claims.

This application is a continuation-in-part of our application of the same title Serial No. 590,720 filed April 27, 1945, now abandoned.

We claim as our invention:

1. As a new composition of matter, a di-hydroxy aluminum mono-salt of an aliphatic amino acid selected from the group consisting of glycine, alanine, lysine, glutamic acid and arginine.

2. The method of preparing a basic aluminum salt of an aliphatic amino acid, which comprises dissolving in water an aliphatic amino acid selected from the group consisting of glycine, alanine, lysine, glutamic acid and arginine, and incorporating into the resulting solution an aluminum alcoholate.

3. The method of preparing a basic aluminum salt of an aliphatic amino acid, which comprises dissolving in water an aliphatic amino acid selected from the group consisting of glycine, alanine, lysine, glutamic acid and arginine, incorporating into the resulting solution an aluminum alcoholate, and separating the resulting precipitate of the basic aluminum salt of the aliphatic amino acid so selected.

4. The method of preparing a basic aluminum salt of an aliphatic amino acid, which comprises dissolving in water an aliphatic amino acid selected from the group consisting of glycine, alanine, lysine, glutamic acid and arginine, and incorporating into the resulting solution aluminum isopropoxide, the aliphatic amino acid selected being present in molal excess with respect to said aluminum isopropoxide, and separating the resulting precipitate of the basic aluminum salt of the aliphatic amino acid so selected.

5. The method of preparing a basic aluminum salt of an aliphatic amino acid, which comprises dissolving in hot water an aliphatic amino acid selected from the group consisting of glycine, alanine, lysine, glutamic acid and arginine, and incorporating into the resulting solution an aluminum alcoholate dissolved in the corresponding alcohol, the aliphatic amino acid selected being present in greater than equi-molal proportions with respect to said aluminum alcoholate, and separating the resulting precipitate of the basic aluminum salt of the aliphatic amino acid so selected.

6. As a new composition of matter, di-hydroxy aluminum mono-glycinate.

7. A method of preparing a basic aluminum glycinate comprising providing an aqueous solution containing more than one mole of glycine, incorporating with said solution at a temperature of approximately 80° C. about one mole of aluminum isopropoxide, separating the resulting precipitate of aluminum mono-glycinate, and drying the separated precipitate to remove excess isopropyl alcohol.

8. The method of preparing aluminum monoglycinate which comprises reacting at an elevated temperature an aqueous solution of glycine with an aluminum alcoholate employed in less than stoichiometrical proportions, separating the resulting precipitate of aluminum glycinate, and drying the precipitate to remove excess alcohol.

9. A method of preparing aluminum monoglycinate which comprises reacting at an elevated temperature an aqueous solution of glycine with aluminum isopropoxide employed in less than stoichiometrical proportions, separating the resulting precipitate of aluminum glycinate, and drying the precipitate to remove excess isopropyl alcohol.

10. The method of preparing aluminum monoglycinate which comprises reacting at an elevated temperature an aqueous solution of glycine containing at least one part of glycine for each ten parts of water with aluminum isopropoxide employed in less than stoichiometrical proportions, separating the resulting precipitate of aluminum glycinate, and drying the precipitate to remove excess isopropyl alcohol.

11. A method of preparing aluminum monoglycinate which comprises reacting at an elevated temperature an aqueous solution of glycine containing at least one part of glycine for each four parts of water with an aluminum alcoholate employed in less than stoichiometrical proportions, separating the resulting precipitate of aluminum glycinate, and drying the precipitate to remove excess alcohol.

JOHN C. KRANTZ, JR.
DOROTHY V. KIBLER.

REFERENCES CITED

The following references are of record in the file of this patent:

UNITED STATES PATENTS

| Number | Name | Date |
|---|---|---|
| 1,967,649 | Wolf | July 24, 1934 |
| 2,011,292 | Knoch | Aug. 13, 1935 |
| 2,101,867 | Miller et al. | Dec. 14, 1937 |
| 2,125,961 | Shoemaker et al. | Aug. 9, 1938 |
| 2,258,718 | Rothrock | Oct. 14, 1941 |

FOREIGN PATENTS

| Number | Country | Date |
|---|---|---|
| 531,960 | France | Jan. 24, 1922 |
| 569,946 | Germany | Feb. 9, 1933 |

OTHER REFERENCES

Gutman, Modern Drug Encyclopedia (1941), 2d ed., page 26.

U. S. Dispensatory, 23d ed. (1943), page 485.

Jour. Pharms. & Exp. Thera 82 (Nov. 1944), p. 247–253, Krantz et al.

Bull. Soc. Chim. France (4) 51 (1932), p. 66, Weizmann.

Comptes Rendus 189 (1929), p. 105, Weizmann.